United States Patent Office 2,881,211
Patented Apr. 7, 1959

2,881,211

POLYCARBOXYLIC ACIDS AND ALKALI METAL SALTS THEREOF FROM CARBOHYDRATES

Russell L. Sperry, Ojai, Calif.

No Drawing. Application January 12, 1956
Serial No. 558,620

11 Claims. (Cl. 260—528)

This invention relates to the production of synthetic chemical compounds from organic materials and their use in drilling muds for deep wells to reduce water loss in drilling.

One object of the invention is to produce novel, synthetic, organic compounds from naturally occurring organic materials known generally as carbohydrates, including the saccharides, and also sometimes collectively called "saccharides."

Another object of the invention is to provide new and effective reagents for conditioning well-drilling muds, more specifically clay-water base drilling fluids.

It is a still further object of the invention to produce high-molecular-weight polycarboxylic acid compounds from carbohydrate materials, and the like, particularly those having five or more carbon atoms per unit sugar molecule (i.e. per sugar unit in each molecule) and to use acids produced therefrom, and alkali salts of such acids, in oil-well drilling muds for reducing water loss during drilling, for reducing the viscosity of the muds, and for emulsifying oil therein.

A further object of the invention is to convert carbohydrates, such as glucose, sucrose, starch, hemicellulose, cellulose, and like carbohydrate derivatives which are hydrolyzable to pentoses, or hexoses, to high-molecular-weight carboxylic acid materials, or their alkali metal salts.

It is also an object of the invention to produce, by acid dehydration or "charring" of the indicated raw materials, black resin-like materials of relatively inert nature and high carbon content (approximating 65% to 71%), it being also an object to convert such resin-like products by fusion or digestion with strong alkalis, particularly the Group I alkali metal hydroxides), at high temperatures to form the water-soluble alkali metal salts of corresponding acidic derivatives of the resin-like materials, it being also an object of the invention to prepare free acids from the indicated salts, as by acidizing solutions of the indicated alkali metal salts, accompanied with the recovery of the acids, which are precipitated.

A still further object is to employ such acidic materials, either in the salt form or in a recovered acid form, to condition drilling muds, for such purposes as reducing the water-loss and viscosity of the mud, improve the wall-cake characteristics, and emulsify oil in the mud.

By the term "carbohydrate" in this application, I refer to that general class of natural organic compounds which includes simple sugars, such as the pentoses and hexoses, the disaccharides such as sucrose, lactose, and mannose, and the polysaccharides, such as cellulose, starch, dextrin and dextran, and also derivatives of the carbohydrates, such as pectins and pectic acids, the gums, such as gum arabic, and other similar materials which are hydrolyzable to pentose or hexose sugars, or hexuronic acids or similar carbohydrates.

The term "saccharides" broadly may also be used as synonymous with the term "carbohydrates," and by this term I mean to include monosaccharides, the di-, tri-, and tetrasaccharides, including the group called oligosaccharides, and all other polysaccharides containing several or many sugar units. In fact, herein the term polysaccharides may be taken to include all saccharides above the monosaccharides.

I have discovered that the carbohydrates and derivatives thereof may be "charged" with strong mineral acids, more particularly sulfuric acid (including sulfur trioxide) and hydrochloric acid, preferably sulfuric acid, under controlled conditions, to yield a black, resin-like, almost inert material which, however, is largely made up of a product soluble in alkali metal hydroxide solutions at high temperature only, that is, in the neighborhood of 450° F. or above, e.g. up to 550° F. or 600° F. Whereas, the complete acid-catalyzed destructive distillation of wood (cellulose, et cetera) to carbon and a variety of organic acids and phenols is well known, this invention relates to the almost quantitative conversion of carbohydrates, including celluloses, to an intermediate black resin-like product which in turn can be converted almost quantitatively to the alkali-metal salts of high-molecular-weight polycarboxylic acids by fusion with, or digestion in water with, alkali-metal hydroxides at temperatures of around 450° F. and above. Although concentrated acids, such as fuming on 98% $H_2SO_4$, are good for charring, concentrations down to 60%, 50%, 20% and even lower such as 5% in the case of $H_2SO_4$, are usable, it being, however, necessary that there be sufficient acid on a water-free basis to char the quantity of carbohydrate being treated. While charring with dilute sulfuric acid may require a few hours, e.g., two to five hours at around 175° F. to 180° F. or within a range between about 150° F. and 250° F. to 300° F., digestion with moderately strong alkali metal hydroxides may require only a few minutes. For example, digestion with sodium hydroxide solution of at least 30% concentration, or in the order of 50% concentration, may complete the solution of the materials soluble therein at 500° F. to 550° F. within a period of about five minutes. While sodium hydroxide (or potassium hydroxide or lithium hydroxide) concentration may be materially lower than 30%, thus requiring longer digestion periods (perhaps one-half hour to one hour), there is no advantage when working with such lower concentrations, especially since it is very desirable to employ a caustic solution of relatively high concentration in the indicated high temperature range for only a few minutes. The free acids are precipitated by acidifying a solution of the alkali metal salt and may be recovered in the usual manner.

The yields, analyses, and properties of the chars, and of the free acids derived by the above process from glucose, sucrose, starch, pure alpha ($\alpha$) cellulose, and cotton are so closely identical as to indicate a constant composition. Infra-red and element analyses of the free-acids derived from alpha cellulose by this process proved the product to be a high molecular weight polycarboxylic acid containing hydroxyl groups of approximate formula $(C_{12}H_{11}O_3)_x$. Every analysis of the acids derived from these various carbohydrates fell within the range indicated by the following formula $(C_{12}H_{11-13}O_{2.7-3.0})_x$.

There is a very great variety of source materials falling within the class of carbohydrates having five or more carbon atoms per molecule of each basic sugar unit, and, so far as is presently known, all such materials of this general classification of carbohydrates or saccharides are usable. Thus the following pure materials have been successfully converted through the intermediate "resin" to the free acids: glucose, arabinose, sucrose, alpha cellulose, starch, dextran, xylose, pectin, algin, and carboxy methyl cellulose. Also the following crude carbohydrate products have been converted to the acids, the properties varying from those above only to the extent that should be expected as a result of the "impurities" present in the raw material: wood, sawdust, wood bark, wood pulp, wood excelsior, kraft paper, corn cobs, corn stalk, beet cossettes, Quaker Oats Company's "Furafils," seaweed algins, et cetera. The almost unlimited sorues of raw materials available include cotton gin waste, oat hulls, waste paper, sugar cane bagasse, cotton seed hulls, lignocelluloses, starches, beet cossettes, et cetera.

Other materials include straw, nut shells, rice, wheat, potatoes, hemp, jute paper and paper pulps, pectic acids, gum arabic, the hexoses and pentoses, celluloses, pentosans, and similar materials hydrolyzable to pentose and hexose and hexuronic acids. The mentioned "Furafils" are the residue remaining from the commercial preparation of furfural from waste corn products (cobs, etc.), which residue contains about 45% cellulose plus other carbohydrate and organic materials.

As a consequence of the above listings of usable carbohydrates (or saccharides) it is apparent that the classification of raw materials to be used as stocks includes all the carbohydrates containing 5 or more carbons per sugar unit in the molecule and all the monosaccharides, and di-, tri-, and higher polysaccharides, such as starches, and the refined and crude celluloses and cellulosic vegetable waste.

PROCEDURE

The procedure as a whole involved in this improvement involves several steps which principally include the following:

Step I.—The carbohydrate material is charred with acid preferably sulfuric acid or acceptable strong hydrochloric acid, under appropriate conditions.

Step II.—The char may be crushed and washed with water to remove residual acid.

Step III.—The char, wet or dry, is mixed with alkali metal hydroxide such as sodium hydroxide, both the char and the hydroxide being preferably powdered or crushed, or such powdered or crushed char is slurried in a water solution of the alkali metal hydroxide. By fusion of the char and hydroxide mixture (starting wet or dry) at a temperature of about 450° F. or above, such as up to 600° F., or by digestion of a water slurry of the mixture in a pressure reactor at about 450° F. or above, the char is converted to water-soluble salts of high-molecular-weight organic acids. Such salts may be recovered from the aqueous solution as by evaporating to obtain substantially pure salts containing perhaps residual alkali metal hydroxide, and carbonates.

Step IV.—Water solution of the sodium salts formed as above is acidified with mineral acid such as sulfuric acid, or with weak organic acid such as acetic acid, whereupon the high-molecular-weight synthetic acids produced by the charring and the high temperature reaction with the alkali metal hydroxide are precipitated at about 7 pH or lower pH. The precipitated high-molecular-weight acids are then isolated and washed with water to remove soluble materials.

The "char" produced by Step I above is a black resin-like material which may sometimes hereafter be referred to as a resin. The reaction of this char or resin with alkali metal hydroxide as in Step I converts the char largely to the indicated high-molecular-weight acid salts, which is the only characterizing reaction of the desired product of Step I which is, at the present time, known to me.

When properly prepared from pure saccharides or carbohydrates, the washed and dried char requires a minimum of about 40% by weight of sodium hydroxide (or the equivalent potassium hydroxide or lithium hydroxide) based on the weight of the char to effect complete conversion to the corresponding high-molecular-weight acid salts. The pH of such alkali metal salts is about 9.0 to 10.5 in water solution. The highest over-all conversion of carbohydrates to the water-insoluble, acid-insoluble high-molecular-weight organic acids of Step IV has been 58% based on dry glucose, sucrose, alpha cellulose, and starch, these being 60% to 68% yields of "resin," with 90% to 94% conversion of the char or resin to such high-molecular-weight organic acids. The char when properly prepared from pure carbohydrates as above indicated is insoluble in all of the common solvents which have been tested, such as: benzene, xylene, acetone, alcohols, dioxane, ethylene glycol, water, benzine, and triethanolamine, and is insoluble in caustic solution of 5% to 50%, even at 350° F. but reacts and becomes completely soluble in caustic solution of 5% to 50% at about 450° F. or above, as previously indicated. Even at 450° F., the reaction is relatively slow and often requires an hour or more to go to completion. At 490° F. to 500° or above, such as up to 600° F., the reaction appears almost instantaneous, since completed conversion has often been obtained in five minutes at 500° F.

When mixed materials, such as wood products and by-products, oat hulls, corn cobs, Quaker Oats Company's "Furafils" and the like are used in this process, the char obviously may contain many non-carbohydrate materials which were originally present and were and may remain soluble in water, caustic solution, or other solvents, so that such partial solubility of chars prepared from such raw materials cannot be interpreted to mean that the carbohydrates present were not converted in large measure to the "char" or "resin" described herein.

Specific procedures under the various Steps I, II, III, and IV, as above indicated, are given below, with an appreciable number of examples which detail and clarify the various sequences, much of this material being presented in outline form in order to be more readily understood.

Step I.—Preparation of resin-char

A. USING CONCENTRATED ACIDS

Most carbohydrates dissolve readily in about 80%, or stronger, sulfuric acid, with evolution of heat. If such a solution is heated to about 170° F. to 180° F. or the temperature rises as a result of the exothermic dissolution, a vigorous exotherm results with the formation of the desired resin char.

*Example 1.*—17.5 gm. paper hand toweling was dissolved in 40 gm. concentrated (98%) sulfuric acid. Shortly after solution was complete, the temperature of the reaction mass rose from about 140° F. to 280° F. within a few minutes, some $SO_2$ and $SO_3$ was evolved, and the slurry increased in volume and set-up to a semisolid black mass. The mass was crushed, washed thoroughly with water, and dried to yield 10.0 gm. of "resin-char" for a 64% recovery, based on the dry weight of the paper (15.6 gm.).

*Example 2.*—17.5 gm. kraft paper was dissolved in 90 gm. of cold 98% sulfuric acid. During the following half hour the solution expanded, set up to a black jelly, and finally set up to a semisolid. The washed and dried product weighed 9.5 gm. for a 61% recovery based on the dry weight of the paper (15.6 gm.).

The resin-chars above were insoluble in boiling 50% sodium hydroxide solution, but by the general procedures as described above a 35% conversion to high-molecular-weight acids was effected by heating 4.5 gm. char, 4.5 gm. NaOH and 15 gm. water in a pressure reactor at about 465° F. for 1 hour; also a 70% conversion was effected by fusing 3 gm. of char and 3 gm. NaOH from 480° F. to 550° F. for a few minutes. The free acids were recovered as indicated above.

*Example 3.*—10 gm. of dry, powdered sugar (sucrose) was added with mixing to 10 gm. concentrated sulfuric acid. The exothermic conversion to a solid black mass was complete within five minutes of completing the addition. 6.8 gm. or 68% yield of resin char was recovered.

*Example 4.*—10 gm. of dextrose was dissolved in 20 gm. 98% sulfuric acid, and heating for 15 minutes at 100° C. (212° F.) converted the solution to a solid black char. The result was a 52% yield of resin, insoluble in boiling caustic, but fusible with caustic at high temperature (as herein described) to yield soluble salts.

*Example 5.*—An identical reaction to that of Example 4 using concentrated (37%) HCl instead of sulfuric acid yielded 40% of isoluble "resin" or resin char.

*Example 6.*—10 gm. "Marasperce C," a commercial lignocellulose, was slurried in 36 gm. 98% sulfuric acid, and 6 gm. or 60% yield of black resin was formed during the vigorous exothermic reaction. This product was identical to the above chars with regard to reaction with sodium hydroxide.

*Example 7.*—100 gm. of Quaker Oats Company's "Furafil C" was mixed with 50 gm. of 80% sulfuric acid to obtain uniform wetting. The mix was heated over night at 180° F. to 190° F. The thoroughly washed, and dried char weighed 65.5 gm. for a 65.5% yield.

This char was converted to soluble sodium salts by heating 14.7 gm. thereof and 5.7 gm. NaOH in 200 cc. of water at 480° F. to 500° F. for ½ hour.

Concentrated sulfuric acid for the above examples may vary between 80% and 100% $H_2SO_4$. Fuming sulfuric acid containing free $SO_3$ may be used although no apparent advantage results.

B. USING DILUTE SULFURIC ACID

*Example 8.*—15.6 gm. of kraft paper was soaked in 90 cc. of 20% sulfuric acid for 15 minutes. 68 cc. of the acid solution was removed from the paper by squeezing, leaving approximately 5 gm. of $H_2SO_4$ as a 20% solution absorbed on the paper. The prepared paper was spread out in glass dishes and heated in an oven to a top temperature of 270° F. over a 3-hour period. The black brittle product was thoroughly washed with water and dried to yield 10.1 gm. of product, a 65% yield.

9 gm. of such char or resin, 9 gm. NaOH and 29 cc. of water were charged into a high pressure bomb, which was then heated in an oil bath at 470° F. to 480° F. for four hours. The resulting thick black solution was diluted to a liter with water, filtered, then acidified with hydrochloric acid. The insoluble acids were filtered, thoroughly washed with water and dried. 8 gm. of acid product was recovered which is a 90% conversion of the char to acids, and a 50% over-all conversion of the paper to acids.

*Example 9.*—20 gm. of predried excelsior (white pine) was soaked for 1 hour in 200 cc. of solution containing 40 gm. of $H_2SO_4$. The excelsior was withdrawn holding 36 cc. of the acid solution or 7.2 gm. as $H_2SO_4$ absorbed in the 20 gm. of wood. The material was heated for 16 hours at 200° F. The weight of recovered char, washed and dried as usual, was 11.1 gm. or 55.6% based on the weight of the wood.

5 gm. of the above, 2.5 gm. NaOH, and 40 cc. water were heated in a bomb at 450° F. to 480° F. for one hour. 7.5 gm. of soluble black sodium salts were recovered by drying the filtered solution formed. The pH of the solution was 11.2.

*Example 10.*—5 gm. of starch was slurried in a solution of 5 cc. 98% sulfuric acid in 20 cc. water. The paste was heated at 250° F. for 1 hour. The washed and dried char weighed 2.9 gm. for a 58% yield. Complete solubility resulted when the char plus 1.7 gm. NaOH and 10 cc. $H_2O$ were heated for 1 hour at 480° F. to 500° F.

*Example 11.*—50 gm. of "Furafil M" (from Quaker Oats Company) was wetted with a solution of 40 gm. $H_2SO_4$ in 60 cc. of water; thorough mixing appeared to give uniform wetting. The wet material was heated at 200° F. to 210° F. over night. The black cake was ground, washed, and dried to yield 34.7 gm. char for a 69.4% yield.

*Example 12.*—20 gm. of 86.8% pectin was slurried in a solution of 20 gm. $H_2SO_4$ (80%) in 20 cc. of water, and the slurry heated 16 hours at 180° F. to 200° F. 9 gm. of the resultant washed and dried char was recovered, or a 52% yield.

5 gm. of such char+3 gm. NaOH+75 cc. water were heated in the bomb at about 480° F. for 1 hour. Traces of insolubles were removed by filtration, and a quantitative yield of sodium salts of pH 9.3 was recovered on drying.

*Example 13.*—Practically identical results to Example 12 were obtained with algin (Keltex Corp.'s "Kelgum") and with gum arabic.

*Example 14.*—A sheet of pure alpha cellulose (52.1 gm.) was soaked in 50% by weight sulfuric acid; the cellulose was then squeezed through a ringer until the total weight of cellulose plus absorbed acid was 114.2 gms. leaving a ratio of 0.6 part $H_2SO_4$ to 1 part of cellulose. The material was then heated for 19 hours at a top temperature of 182° F. The resultant black cake was ground, thoroughly washed with water, and dried to constant weight of 28.7 gm. for a 55% yield.

10 gm. of this char was converted to 7.8 gm. of acids by the bomb procedure, the acids isolated, washed excessively, dried and sent to the American Cyanamid Co. Stamford Research Laboratories for analyses. Results of infra-red and element analyses indicated the products to be "high-molecular-weight polycarboxylic acids containing hydroxyl groups . . . of indicated base structure $(C_{12}H_{11}O_3)_x$."

*Step II.—Washing char*

This merely involves breaking or crushing the char or resin and washing it with water to remove residual acid.

*Step III.—Conversion to alkali metal salts*

This step involves conversion of the char or resin into alkali metal salts of high molecular weight organic acids. This step appears in some of the examples above as a final step following the charring. Such examples are Examples 2, 7, 8, 9, 10 and 12. Additional examples are given below.

The particular resin-char used in the following examples was prepared from paper as follows: 31.2 gm. of paper was soaked for a half hour in a solution of 100 gm. of 80% sulfuric acid diluted to 200 cc. volume with water. 120 cc. of the acid solution was separated from the paper by decantation and squeezing, and the treated paper heated over night at 170° F. to 180° F. The dry char was crushed, thoroughly washed with water and dried to constant weight. The yields for two batches were 18.4 gm. and 18.5 gm. or 59% in each case. A third batch gave a yield of 60.2% of char.

A. PREPARATION OF SODIUM SALTS BY FUSION

*Example 15.*—6 gm. of dry char and 6 gm. NaOH (C.P.) were ground together, charged into a small pressure bomb, and heated at 480° F. to 500° F. for 1 hour. The fused mass was dried to a constant weight 11.5 gm. The resultant brownish black salts were very soluble in water.

*Example 16.*—6 gm. of char and 4.8 gm. NaOH treated as above yielded 10.4 gm. of soluble sodium salts.

*Example 17.*—6 gm. of char+3.6 gm. NaOH+2 gm. $H_2O$ treated as above, yielded 9.5 gm. of black soluble salts.

B. PREPARATION OF ALKALI METAL SALTS BY DIGESTION IN SOLUTION OF ALKALI METAL HYDROXIDE

*Example 18.*—9.3 gm. of above char, 5.6 gm. NaOH, and 150 gm. of water were charged to a bomb and heated at 460° F. to 480° F. for 1 hour. The dark black solution having pH 11.5, was filtered, and dried at 200° F. to 220° F. to yield 14.8 gm. of soluble sodium salts.

*Example 19.*—5 gm. of char, 4.2 gm. KOH, and 75 cc. of water were heated as usual to 480° F. for 1 hour. The yield of dry soluble potassium salts was 8.7 grams.

*Example 20.*—5 gm. of char, 2.165 gm. NaOH, and 30 cc. of water were heated for 5 minutes at 495° F. to 508° F. The jelly-like solution of sodium salts had a pH of 11.0.

*Example 21.*—The same charge as in Example 20 yielded a thick solution of sodium salts of pH 10.0 when heated for 1 hour at 480° F. to 500° F.

*Example 22.*—A charge of 5 gm. char and 2.0 gm. NaOH (40% based on the weight of the char), and 30 cc. water were heated 15 minutes at 480° F. to 500° F. A thick solution resulted which had pH 10.3.

*Example 23.*—Char was prepared from Quaker Oats Company's "Furafil C" by mixing 30 gm. of "Furafil C" with a solution of 15 gm. of 98% sulfuric acid and 15 cc. of water until uniform wetting was obtained. The wet product was then heated over night at 170° F. to 180° F. The ground, washed, and dried product weighed 19.5 gm. for a 66% recovery.

5 gm. of such char, 1.5 gm. NaOH, and 25 cc. of water were heated in a bomb for 15 minutes at 500°±5° F. 6 gm. of water-soluble sodium salts was obtained on drying the thick solution (pH=10.4).

*Example 24.*—Char was prepared from redwood sawdust exactly as described in Example 23 above for "Furafil C" giving a yield of 60.0% char. Only a trace of insolubles remained on heating 5 gm. of the char, 2 gm. NaOH and 25 cc. of water for only 5 minutes at 490° F. to 500° F. Water-soluble salts were recovered amounting to 6.6 gm.

*Example 25.*—Char resin was prepared from xylose exactly as previously described for sugar (sucrose) (Example 3). Only a trace of insolubles remained on heating 8.6 gm. of the char with 3.8 gm. of $LiOH \cdot H_2O$ in 40 cc. of water at 490° F. to 500° F. for ½ hour.

*Step IV.—Free acid production*

As has been indicated above, the free high molecular organic acids may be produced from a water solution of the above-described alkali metal salts by acidifying the solution with a mineral acid, such as hydrochloric acid, sulfuric acid or nitric acid to any pH below about 7. This results in precipitating the desired organic acids. Such precipitate is readily separated, washed and dried.

As specific examples of the production of the free organic acids of this invention the following examples are given:

*Example 26.*—The water solution of the alkali metal salts of Example 25 was filtered and acidized with hydrochloric acid to pH 6.5 to yield a precipitate. This precipitate when separated, washed and dried amounted to 7.4 gm. recovery from the original 8.6 gm. of char.

*Example 27.*—As indicated under Example 14, 10 gm. of char from pure alpha cellulose was converted to 7.8 gm. of acids by first fusing with sodium hydroxide, then dissolving in water and precipitating the acids by acidifying with sulfuric acid, the precipitated acids being separated, washed and dried to yield the mentioned 7.8 gm. of free acid product.

*Example 28.*—As indicated in Example 8, 9 gm. of the described paper char was converted to the sodium salts of the acids in water solution at high temperatures around 470° F. to 480° F., the solution being then acidified with hydrochloric acid. The pH of the solution was about 3. The precipitated acids were separated, washed and dried to yield 8 gm. of acid product which was a 90% conversion of the char to free acids, or a 50% over-all conversion of the paper starting material.

1. CHARACTERISTICS OF CHAR RESINS AND THE ACIDS DERIVED THEREFROM

In general résumé, char resins were prepared from a considerable variety of raw carbohydrate materials by the two general methods outlined for the several items below:

(1) Excelsior—Soaked in excess dilute $H_2SO_4$ with heat at 160° F. to 180° F. for 16 hours.

(2) Sucrose—Dissolved in excess concentrated $H_2SO_4$ with exothermic heating from about 180° F. to 280° F.

(3) Redwood sawdust—Same as item 1 above.

(4) Gum arabic—Same as item 2 above.

(5) Sodium alginate—Same as item 1 above.

(6) Pectin—Same as item 1 above.

(7) Starch—Same as item 2 above.

(8) "Furafil C"—Same as item 1 above.

(9) Xylose—Same as item 2 above.

The washed and dried chars of the nine items above were all converted to their free acids, with 60% to 80% yields, by heating 5 gm. of each char with 2.5 gm. NaOH (equivalent amount of $LiOH \cdot H_2O$ for item 9) in 20 cc. of water at 490° F. to 510° F. for 15 minutes. Each solution of the alkali metal salts was recovered by filtering, diluting to about 1 liter, and acidifying with hydrochloric acid which precipitated the free organic acids. These high molecular weight free organic acids were in turn filtered off, washed and dried.

The similarity of the char resins and their free acids, regardless of source and method of preparation, is indicated by the activities of the acids in contaminated drilling muds, as indicated hereinafter, and also by their solubility in various solvents. Qualitative solubility tests in boiling solvents are indicated in the following table, wherein:

I=insoluble, indicated by no color in the solvents;

SS=very slightly soluble, indicated by extremely slight color probably due to soluble impurities;

S=soluble as indicated by sufficient reddish black color showing the acids themselves to be somewhat soluble;

VS=very soluble.

SOLUBILITIES OF CHARS

| Chars | 1 | 2 | 3 | 4 | 5 | 6 | 7 | 8 | 9 |
|---|---|---|---|---|---|---|---|---|---|
| Acetone | I | I | I | I | I | I | I | I | I |
| Triethanolamine | I | I | SS | I | I | I | I | SS | I |
| Benzine | I | I | I | I | I | I | I | I | I |
| Benzene | I | I | I | I | I | I | I | I | I |
| Xylene | I | I | I | I | I | I | I | I | I |
| Ethylene glycol | I | I | I | I | I | I | I | I | I |
| Water+NaOH | I | I | SS | SS | I | SS | I | SS | I |

SOLUBILITIES OF FREE ACIDS FROM ABOVE CHARS

| | 1 | 2 | 3 | 4 | 5 | 6 | 7 | 8 | 9 |
|---|---|---|---|---|---|---|---|---|---|
| Dioxane | SS | SS | SS | SS | SS | SS | SS | SS | SS |
| Acetone | I | I | SS | I | I | I | I | SS | I |
| Ethanol | I | I | I | I | I | I | I | I | I |
| Benzine | I | I | I | I | I | I | I | I | I |
| Ethyl acetate | I | I | SS | I | I | I | I | SS | I |
| Benzene | I | I | I | I | I | I | I | I | I |
| Xylene | I | I | I | I | I | I | I | I | I |
| Benzaldehyde | S | S | S | S | S | S | S | S | S |
| Ethylene glycol | VS | VS | VS | VS | VS | VS | VS | VS | VS |
| Ethylene glycol Monoethyl ether | VS | VS | VS | VS | VS | VS | VS | VS | VS |
| Glycerine | VS | VS | VS | VS | VS | VS | VS | VS | VS |
| Triethanolamine | VS | VS | VS | VS | VS | VS | VS | VS | VS |
| Aniline | SS | SS | SS | SS | SS | SS | SS | SS | SS |
| Water+NaOH | VS | VS | VS | VS | VS | VS | VS | VS | VS |
| Water+$NH_4OH$ | VS | VS | VS | VS | VS | VS | VS | VS | VS |
| Water+triethanolamine | VS | VS | VS | VS | VS | VS | VS | VS | VS |
| Water+$Ba(OH)_2$ | I | I | I | I | I | I | I | I | I |
| Water+$Ca(OH)_2$ | I | I | I | I | I | I | I | I | I |

DRILLING MUD TREATMENT

The use of high molecular weight carboxylic acids and their sodium salts, of this invention, for treating drilling muds will be understood by those skilled in the art from the results supplied by the following examples. Such high-molecular-weight products are shown to be effective in various types of clay-water-base and oil-in-water-emulsion muds as commonly used by the oil industry. For laboratory purposes three basic types of muds are generally employed for testing purposes. These are:

(1) Low pH (7.5 to 10) sodium mud made up of a good sodium bentonite clay such as the commercial clay P-95 as designated in the following tables, hydrated in relatively soft water (up to 400 g.p.g. hardness as $CaCO_3$);

(2) Low pH (7.5 to 10) gypsum-contaminated salt-contaminated muds made up by adding sodium clays or gel to extremely hard salt-contaminated water to yield a highly contaminated mud, or hydrating a naturally contaminated clay such as the very well known clay mined at Ventura, California, and designated as Dent mud in the following tables;

(3) High pH (10 to 13) lime mud prepared by adding lime and caustic to any clay-base drilling mud along with powdered lignite, quebracho, or other tannin, or other similar well known reagent, in amount sufficient to retain suitable viscosity, gel characteristics, and water-loss control properties despite the excessive lime contamination.

Oil may be added to any of the above muds to form oil-in-water-emulsion muds.

In order to show the valuable characteristics of the present high-molecular-weight reagents in both salt and free acid form, comparative tests with well known standard reagents, which were run simultaneously, are presented. Such reagents have been indicated in the following tables as:

(1) "Aeropan" which is a sodium polyacrylate marketed by American Cyanamid Co., and is a very active non-emulsifying water-loss control reagent in general use in low pH muds, at least in California;

(2) Quebracho which is a well known tannin extract in general use for viscosity and water-loss control in all types of clay base muds, being also a non-emulsifier.

All tests were run by adding the indicated number of grams of reagent to 350 cc. of the prepared mud, these amounts being the equivalent to the same number of pounds per 42-gallon barrel of mud. Such modified mud in each test was then heated with agitation in a closed vessel at 150° F. to 160° F. for 18 to 24 hours. The water loss was run on the hot mud by the standard A.P.I. 100 lbs. per sq. in. method and the water loss recorded as cc. of filtrate in 7.5 minutes and 15 minutes. The viscosities for present purposes are recorded as thick, medium, and thin.

Two series of tests are furnished, the first being with the alkali metal salts of such acids, and the second being with the free acids themselves. The free acids are designated as X in the tables and their sodium and potassium salts are designated respectively as NaX and KX. In addition to the reagent, viscosity and water-loss times, the source of the char is indicated as well as the pH of the mud at the end of the test.

These tests are presented as sets or "series" for particular, indicated muds having the weights given, a test with a well known control agent or a blank on the respective mud appearing first under each series and then the tests with the products of the present invention as derived from various designated carbohydrates.

USE OF SALTS IN MUD

| Test No. | Gm. | Reagent | Char source | cc. Water loss 7.5 min. | cc. Water loss 15 min. | Viscosity | pH |
|---|---|---|---|---|---|---|---|
| Series No. 1 ||||||||
| *[Tests on Dent clay hydrated in soft water using 350 cc. mud of 77 lbs. per cu. ft.]* ||||||||
| 1 | | Blank | | 30.0 | | Thick | 6.7 |
| 2 | 4 | NaX | Gum arabic | 6.2 | 8.4 | Medium | 7.7 |
| 3 | 4 | KX | Paper | 10.0 | 15.0 | Thin | 7.3 |
| 4 | 4 | NaX | Pectin | 6.4 | 8.6 | Medium | 8.3 |

Series No. 2

*[Same mud as Series No. 1]*

| Test No. | Gm. | Reagent | Char source | 7.5 min. | 15 min. | Viscosity | pH |
|---|---|---|---|---|---|---|---|
| 5 | ½ + ½ | "Aeropan" + Sodium tetra phosphate | Commercial | 9.0 | 13.0 | Thin | 8.0 |
| 6 | 2 | NaX (pH 11.0) | Paper | 6.6 | 9.4 | Medium | 8.3 |
| 7 | 2 | NaX (pH 10.0) | do | 7.4 | 10.5 | do | 8.2 |

Series No. 3

*[Same mud as Series No. 1]*

| Test No. | Gm. | Reagent | Char source | 7.5 min. | 15 min. | Viscosity | pH |
|---|---|---|---|---|---|---|---|
| 8 | 3 + 1 | Quebracho + NaOH | Commercial | 8.8 | 13.4 | Thin | 9.4 |
| 9 | 3 | NaX | Excelsior | 6.4 | 9.6 | Medium | 9.1 |
| 10 | 3 | NaX | do | 6.0 | 8.9 | Thin | 9.2 |
| 11 | 3 | NaX | do | 6.1 | 9.3 | do | 9.4 |

Note.—In Series No. 3 the pH of the mud was adjusted by adding varying amounts NaOH solution, attempting to adjust to 9.0 pH in all cases.

Series No. 4

*[Mud used was 78 lbs. per cu. ft. P-95 clay hydrated in soft water, employing 350 cc. per test]*

| Test No. | Gm. | Reagent | Char source | 7.5 min. | 15 min. | Viscosity | pH |
|---|---|---|---|---|---|---|---|
| 12 | ½ + ½ | "Aeropan" + Sodium tetra phosphate | Commercial | 5.0 | 7.4 | Medium | 8.1 |
| 13 | 2 | NaX | "Furafil C" | 7.6 | 10.4 | do | 8.9 |
| 14 | 4 | NaX | do | 4.8 | 6.2 | do | 9.3 |
| 15 | 6 | NaX | do | 3.6 | 4.8 | do | 9.6 |
| 16 | 4 | NaX | Paper | 3.8 | 5.2 | do | 9.4 |

Series No. 5

[Tests on high pH lime mud of 80 lbs. per cu. ft. from Dent clay. The indicated reagents were added to the mud and the samples heated as usual for four hours. Then 3 gm. of lime and 1 gm. NaOH were added to each, and the heating and agitation continued for sixteen hours when the results below were obtained]

| Test No. | Gm. | Reagent | Char source | cc. Water loss 7.5 min. | cc. Water loss 15 min. | Viscosity | pH |
|---|---|---|---|---|---|---|---|
| 17 [1] | | (¹) | | | | | |
| 18 | 3 | Quebracho | Commercial | 10.8 | 15.5 | Thin | 13+ |
| | 1 | NaOH | | | | | |
| 19 | 4 | NaX | Paper | 11.2 | 16.4 | do | 13+ |
| 20 | 4 | NaX + | Paper | 8.6 | 12.6 | do | 13+ |
| | ½ | NaOH | Commercial | | | | |

[1] Blank—too thick to pour.

Especially from Series No. 4 above, it will be noted that the greater the proportion of the given alkali metal salt employed, the lower is the water loss. This is particularly true in a range of about ¼ lb. per barrel to 6 lbs. per barrel of salt in the mud and continues up to about 10 lbs. per barrel in normal muds. As is well known to those trained in the art, the concentration of reagent required to produce a desired effect will vary extremely with the type of mud and the particular effect desired. As much as 20 lbs. of a reagent per barrel of mud might prove advantageous to emulsify 20%, 30% or 40% of oil in the mud, to overcome the effects of extreme salt or gypsum contamination, or in preparing lime muds of extreme lime concentration. Therefore, the effectiveness of a reagent can be proved, but an upper limit of practical concentration cannot be limited to the effect on any one mud.

*Use of free acids in drilling muds.*—The free acids of this invention, as has previously been indicated, are also usable for control of viscosity in the muds and of water loss from the muds. They also have excellent oil-emulsifying characteristics.

In field practice, other organic acid materials such as tannins and powdered lignites are sometimes directly added to the drilling muds. However, more generally such materials are predissolved in sodium hydroxide solution in the ratio required to obtain the desired pH control of the mud. The acids of the present invention similarly may be used in either way. If predissolved in caustic solution they show activities similar to those of the original sodium salts from which they were prepared. In either case, since the pH of the mud generally is above 7.5, the organic acid is present in the mud in salt form, and the activity of the acid is then effectually a measure of the activity of the soluble salts formed in the mud.

The activity of these free acids, as compared with Quebracho and lignite, is indicated in the following Series No. 6 wherein a mud of 85 lbs. per cu. ft. was prepared from the previously described P-95 clay hydrated in extremely hard water and pretreated with 1 lb. per barrel of quebracho extract with 1 lb. per barrel (42 gals.) of sodium hydroxide (dry). From this mud various samples were prepared, heated and tested to give the results below, X representing the free acid of this invention.

SERIES NO. 6

| Test No. | Gm. | Reagent | Char source | cc. Water loss 7.5 min. | cc. Water loss 15 min. | Viscosity | pH |
|---|---|---|---|---|---|---|---|
| 21 | | Blank | | 7.2 | 11.0 | Medium | 9.8 |
| 22 | 2 | Quebracho | Commercial | 4.5 | 6.8 | do | 9.4 |
| 23 | 2 | Lignite | do | 7.0 | 10.2 | Thin | 9.5 |
| 24 | 2 | X | Excelsior | 4.6 | 6.8 | do | 9.1 |
| 25 | 2 | X | Sucrose | 4.8 | 7.4 | do | 9.1 |
| 26 | 2 | X | Redwood sawdust | 4.8 | 7.8 | do | 9.1 |
| 27 | 2 | X | Gum arabic | 4.4 | 6.6 | do | 9.0 |
| 28 | 2 | X | Sodium alginate | 5.4 | 7.6 | do | 9.2 |
| 29 | 2 | X | Pectin | 5.2 | 7.4 | do | 9.2 |
| 30 | 2 | X | Starch | 3.8 | 5.8 | do | 9.0 |
| 31 | 2 | X | "Furafil C" | 4.2 | 6.5 | do | 9.0 |
| 32 | 2 | X | Xylose | 3.6 | 5.4 | do | 9.0 |

In addition to the value of the present acids and their alkali metal salts for controlling the viscosity and water loss of drilling muds, they also have excellent emulsifying properties. Thus, the twelve test samples of mud of Series No. 6 above were recovered, including their filtrates and wall cakes which were redispersed in each instance; 10% by volume of 32 gravity Ventura crude oil was then added to each sample; the samples were reheated with agitation at 160° F. to 170° F. for four hours; and such samples again tested for water loss and also for the presence of free oil, as follows:

| Test No. | Results | cc. Water-loss 7.5 min. | cc. Water-loss 15 min. |
|---|---|---|---|
| 21a | Excess free oil | 7.8 | 11.8 |
| 22a | do | 4.2 | 6.4 |
| 23a | Some free oil | 7.2 | 10.8 |
| 24a | Oil completely emulsified | 3.2 | 4.6 |
| 25a | do | 2.5 | 3.9 |
| 26a | do | 3.0 | 4.6 |
| 27a | do | 2.6 | 4.0 |
| 28a | do | 3.4 | 4.8 |
| 29a | do | 2.8 | 4.6 |
| 30a | do | 2.4 | 3.5 |
| 31a | do | 2.6 | 3.9 |
| 32a | do | 3.0 | 4.5 |

From the table immediately above it is apparent that the free acids and the alkali salts of this improvement possess great oil-emulsifying capacity, which improves the water-retention characteristics. Although these tests indicate oil emulsification up to 10% oil these acids have also been capable of emulsifying oil up to about 30% to 40% of the mud by volume.

With reference to the charring of carbohydrates according to the present invention, the term "charring" and the corresponding term "char" signify the production of a black char resin by the respective strong mineral acid employed, the treatment, however, not being carried to yield a largely free-carbon product but to yield a resinous reaction product, or dehydration product, which product is reactable with strong alkali metal hydroxides such as sodium hydroxide at high temperatures to yield the described corresponding alkali metal salts which are soluble in water and from which solution the described high-molecular-weight organic acids are precipitated upon acidification.

It is apparent from the foregoing specification that the indicated char resins are producible from carbohydrates by reaction with sulfuric acid under varying conditions of temperature and ratio of acid to carbohydrate within a range of about 150° F. and about 350° F. and ratios of about 0.3 part of acid to one part carbohydrate up to a large excess of acid. Whereas resin char is formed almost instantly on reacting carbohydrate with 80% or stronger sulfuric acid at about 180° F. or above, practical application in bulk preparation allows wide apparent variations of conditions. Where the temperature of reaction is in the lower range (about 150° F. to 180° F.) and the ratio of sulfuric acid to carbohydrate is about 0.3 to 1 to 0.6 to 1, the time of reaction may be continued for many hours, such as 16 to 24 hours, without materially lowering the yield of desired product. However, as the ratio of acid to carbohydrate is increased and/or the temperature is increased up to about 350° F., the time periods of heating are desirably correspondingly decreased, since otherwise the resin desired is slowly converted to carbonaceous materials which are not soluble in caustic solutions at 500° F.

The use of dilute sulfuric acid is very advantageous, particularly when the raw materials are insoluble or only slowly soluble in acid or water, since it allows uniform distribution of acid throughout the carbohydrate. Under these conditions evaporation of water to yield about 80% or higher acid concentration and subsequent charring of the carbohydrate takes place smoothly without uncontrollable exothermic reaction. The speed of the conversion can be regulated both by the actual temperature of reaction and by the rate of removal of water vapor from the zone of reaction.

Such procedures thus produce the required char resins which are reactable with the alkali metal hydroxides at the indicated high temperatures (450° F. to 600° F.) to yield the indicated water-soluble alkali metal salts from which the free high-molecular-weight water-insoluble organic acids may be obtained by precipitation from water solution upon acidification. In reacting the char with the alkali, the ratio of alkali metal hydroxide to char ranges between about 0.3:1 and about 1.7:1 on a dry weight basis.

I claim as my invention:

1. A method for producing synthetic high molecular weight polycarboxylic acids including: charring carbohydrate materials having at least five carbons per sugar unit in the molecule, with an acid selected from the group consisting of sulfuric acid, sulfur trioxide, and hydrochloric acid in amount approximating one-half part to about one and one-half parts by weight of acid on a water-free basis per part of carbohydrate, such charring taking place at charring temperatures held below about 350° F. to yield a black resin-like product which is substantially insoluble in boiling alkali metal hydroxide solutions, but reacts with and becomes soluble in alkali metal hydroxides at temperatures above about 450° F. to yield water-soluble alkali metal salts of polycarboxylic acids; and digesting said resin-like char with alkali metal hydroxide at temperatures above about 450° F. and thereby forming alkali metal salts of said polycarboxylic acids.

2. A method as in claim 1 including the additional step of separating said polycarboxylic acids from said alkali metal reaction product by acid precipitation.

3. A method as in claim 1 including the additional steps of producing a water solution of said alkali metal salts of said polycarboxylic acids, and acidifying said water solution to precipitate said polycarboxylic acids.

4. A method as in claim 1 wherein the charring temperature is controlled between about 150° F. and 250° F.

5. A method as in claim 1 wherein the digestion of the char with alkali metal hydroxide is conducted between about 500° F. and 600° F.

6. A method according to claim 1 wherein the charring reaction occurs without substantial conversion to free carbon and the char is substantially insoluble in alkali metal hydroxide up to 350° F.

7. A synthetic polycarboxylic acid organic material produced by the process of claim 1.

8. A synthetic polycarboxylic acid organic material produced by the process of claim 3.

9. A method for the preparation of high-molecular-weight synthetic organic materials including: charring carbohydrate materials to char resins with sulfuric acid at temperatures limited between about 150° F. and 350° F.; and reacting the resultant char resins with alkali metal hydroxide at temperatures between about 450° F. and 600° F. yielding water-soluble alkali metal salts of high-molecular organic acids produced, the ratio of the sulfuric acid to the carbohydrate material on a dry basis being in a range of about 0.3:1 and 1.5:1, and the ratio of alkali metal hydroxide to char-resins on a dry basis being in a range of about 0.3:1 to 1.7:1.

10. A method as in claim 9 including: the additional steps of acidizing a water solution of the high-molecular-weight alkali metal salts to precipitate acid constituents, and recovering the precipitated acids.

11. A method for producing alkali metal salts of polycarboxylic acids from carbohydrates consisting essentially in: reacting carbohydrates under controlled conditions with sulfuric acid to produce resins reactable with alkali metal hydroxides to yield alkali metal salts of high-molecular-weight organic acids, such reaction taking place under temperatures and for times to produce resins without substantial conversion to free carbon, the conversion taking place within a range between room temperature for about one-half hour to sixteen hours and about 350° F. for two to five minutes, the acid to carbohydrate ratio being between about 0.3:1 and about 1.5:1 on a dry weight basis; and reacting the resultant resins with alkali metal hydroxide at a temperature between about 450° F. and about 600° F. to yield water-soluble alkali metal salts of acidic constituents formed from the resins.

References Cited in the file of this patent

UNITED STATES PATENTS

| | | |
|---|---|---|
| 608,363 | Eichelbaum | Aug. 2, 1898 |
| 1,718,837 | Schorger | June 25, 1929 |
| 1,834,057 | Henzerling | Dec. 1, 1931 |
| 2,191,063 | Smit | Feb. 20, 1940 |
| 2,293,724 | Faerber | Aug. 25, 1942 |
| 2,322,915 | Brooks | June 29, 1943 |
| 2,396,937 | Bauer et al. | Mar. 19, 1946 |
| 2,407,001 | Griffin | Sept. 3, 1946 |
| 2,713,029 | Fuller | July 12, 1955 |
| 2,713,030 | Brink et al. | July 12, 1955 |